US 6,413,424 B1

(12) United States Patent
Shelby

(10) Patent No.: US 6,413,424 B1
(45) Date of Patent: Jul. 2, 2002

(54) SANITARY STYLE FILTER ELEMENT

(75) Inventor: Irving Shelby, San Diego, CA (US)

(73) Assignee: Hydranautics, Oceanside, CA (US)

( * ) Notice: Subject to any disclaimer, the term of this patent is extended or adjusted under 35 U.S.C. 154(b) by 0 days.

(21) Appl. No.: 09/567,806

(22) Filed: May 9, 2000

(51) Int. Cl.$^7$ .......................... B01D 29/48; B01D 63/10
(52) U.S. Cl. ............................ 210/321.74; 210/321.78; 210/321.83; 210/321.87; 210/493.4; 210/497.1
(58) Field of Search ........................ 210/321.74, 321.77, 210/321.78, 321.83, 321.87, 493.1, 493.4, 497.1

(56) References Cited

U.S. PATENT DOCUMENTS

| | | | | |
|---|---|---|---|---|
| 3,386,583 A | * | 6/1968 | Merten ................... | 210/321.86 |
| 3,417,870 A | * | 12/1968 | Bray ...................... | 210/321.86 |
| 4,301,013 A | | 11/1981 | Setti | |
| 4,792,401 A | * | 12/1988 | Truex et al. ............... | 210/644 |
| 4,842,736 A | * | 6/1989 | Bray et al. ............. | 210/321.61 |
| 4,861,487 A | * | 8/1989 | Fulk, Jr. ..................... | 210/644 |
| 4,902,372 A | | 2/1990 | Lien | |
| 4,906,372 A | | 3/1990 | Hopkins | |
| 4,929,354 A | * | 5/1990 | Meyering et al. ....... | 210/321.61 |
| 5,096,584 A | * | 3/1992 | Reddy et al. .......... | 210/321.74 |
| 5,114,582 A | * | 5/1992 | Sandstrom et al. .... | 210/321.74 |
| 5,460,720 A | * | 10/1995 | Schneider .............. | 210/321.86 |
| 5,538,642 A | * | 7/1996 | Solie ......................... | 210/652 |
| 5,681,467 A | * | 10/1997 | Solie et al. ................ | 210/486 |
| 6,190,557 B1 | * | 2/2001 | Hisada et al. ............... | 210/650 |

OTHER PUBLICATIONS

The evolution of extruded thermoplastic netting at Nalle Plastics Inc. *Filtration and Separation*, Nov./Dec. 1996, 33:1–5. Published by Elsevier Advanced Technology.

Conwed Palstics– Developing Materials to Meet Market Needs. Brochure/advertisement published and copyrighted by Conwed Plastics, 1987.

Desal, Product Specification Series, E–100 Sanitary Ultrafiltration Element, Manufactured by Desalinasation Systems, Inc., Escondido, CA, May 1992.

Koch TFC° HR–NWHS, Net wrapped, Heat Sanitization high rejection 4" & 8" reverse osmosis membrane element product specification, Manufactured by Koch Membrane Systems, Apr. 99.

Minipure Ultrafilter. Advertisement published in 1988.

For quality plastic filtration . . . Advertisement for NSW Corporation published in *Filtration News* Mar./Apr. 1999, p. 19, Eagle Publications, Inc.

An elevated state of the art . . . Advertisement for NSW Corporation published in *Filtration News* Jul./Aug. 1999, p. 21, Eagle Publications, Inc.

* cited by examiner

*Primary Examiner*—John Kim
(74) *Attorney, Agent, or Firm*—Brown Martin Haller & McClain

(57) ABSTRACT

A new sanitary filter element is described which provides a structure which cannot harbor contaminants and is readily and thoroughly cleaned as needed. The new device utilizes a uniquely configured adhesive component and membrane and tricot channel sheets which are significantly trimmed in size following adhesive curing. Such configuration eliminates structures within the filter where bacterial and other contamination, or materials which support such contaminants, can accumulate. In addition, a novel cage structure provides turbulent fluid flow while having improved strength and furnishes a site for permanent identification indicia. Finally, an improved step in the manufacturing process, in which a temporary separation sheet is positioned between the membrane and the feed spacer, prevents the occurrence of random unwanted contact adhesions between the two before and during the curing of the adhesive bonding membranes and their adjacent tricot channeling sheets.

17 Claims, 4 Drawing Sheets

SANITARY STYLE FILTER ELEMENT

BACKGROUND OF THE INVENTION

1. Field of the Invention

The invention herein relates to liquid filtration devices. More particularly it relates to those types of liquid filtration devices known as "sanitary elements" or "sanitary style elements".

2. Description of the Prior Art

In the filtration of many liquids, such as beverage liquids, foods and pharmaceuticals, high purity of the product is required. Therefore it is necessary to clean the filtration system and media frequently. In such filtration equipment, it is intended for the cleaning liquid to have good access to all surface areas of the filtration membrane, so that bacterial concentrations or other contaminants will not accumulate or persist and any material which may contribute to the accumulation or growth of such contaminants or bacteria can be removed.

In the past, however, the designs of sanitary elements have been such that pockets of contaminants, bacteria, bacterial growth materials and the like can form and persist, notwithstanding the periodic washings.

Some prior art filters have incorporated various types of seals at various locations in the filter element, with the intention of trying to insure that contaminants are kept out, but such seals have had scant success. Moreover they have added complexity to the filter element structure, and in doing so have caused other problems such as reducing filter capacity by taking up internal space (the external dimensions of filter elements normally being fixed by the dimensions of the housings into which the filters are to be placed) or leading to increases in filter failures.

Another problem in prior art filters has been unwanted adhesion of the membranes to the feed spacer elements of the leaves. Designs and manufacturing methods have made it possible for contact adhesions to occur other than where the adhesive is supposed to be placed. Such adhesions not only reduce the efficiency of the filter during operation, but also contribute to the formation of inaccessible pockets of contamination.

The solid apertured bypass framework ("cage") around the sanitary element membrane filtration assembly has usually been designed for maximum openness, which has reduced stiffness and allowed for breakage and distortion of the ribs of the cage. Better design could provide both optimum openness and strength.

Finally, indicia on the filters, such as serial numbers, model numbers, and other nomenclature, have been printed with inks that are commonly washed away over the course of the repeated cleaning cycles. The ability to label filters with permanent indicia would be advantageous.

SUMMARY OF THE INVENTION

I have now developed a new sanitary filter element which overcomes these deficiencies of the prior art devices and provides a structure which cannot harbor contaminants, including bacteria, and is readily and thoroughly cleaned as needed. The new device has a hollow fluid-permeable core from which extend, preferably in spiral-wound configuration, a number of leaves. Each leaf is formed of two membrane filter sheets with a tricot sheet for fluid channeling adhered between them. The tricot sheet and both membrane filter sheets all have two sides. Each side of the tricot sheet is in surface contact with a "discharge" side of its adjacent membrane filter sheet. The side of the each membrane filter sheet opposite its discharge side is the "fluid contact" side. The present invention includes a uniquely configured adhesive barrier component along the edges of the membrane filter and tricot sheet of each leaf. Both fluid contact sides of the membrane filter sheets are exposed to fully turbulent flow during operation of the element. Such configuration eliminates structures within the filter where the liquid is quiescent, and where bacterial and other contamination, or materials which support such contaminants, can accumulate. In addition, a novel cage structure provides good fluid flow while having improved strength.

In the manufacture of the element of the present invention, the adhesive is applied as a bead near the peripheral edge or edges of the tricot sheet or the discharge sides of the membrane filter sheets, except at that edge of the tricot sheet which is attached to or faces in the direction of the central core of the element. Once the membrane filter sheets and the tricot sheet have been brought into contact, the adhesive is forced through the tricot sheet, thus adhering the tricot sheet to the two membrane filter sheets, while forming a fluid-tight barrier (usually U-shaped) barrier defining most of the tricot sheet as a fluid-collection pocket. Forcing the adhesive through the tricot sheet also spreads out the adhesive and causes formation of rounded stretches of the adhesive barrier at each point where there is a significant change in the direction of the edge of the tricot sheet, such as at a corner of the tricot sheet. This eliminates the inclusion of small volumes within the tricot sheet where contaminants could collect.

It is preferred to have a feed spacer present between each pair of adjacent leaves, in contact with the exterior fluid contact sides of the leaves. The feed spacers facilitate the flow of the incoming contaminated fluid and help maintain the turbulent flow regime within the element. During manufacture a temporary separation sheet is positioned between each fluid contact side of each membrane and the feed spacer, to prevent the occurrence of random unwanted contact adhesions between the two before and during the curing of the adhesive which bonds the membrane filter sheets.

Therefore, in a broad embodiment, the invention involves a sanitary filter comprising a central fluid permeable core having extending therefrom a plurality of leaves, each leaf comprising a pair of membrane filter sheets having adhered therebetween a tricot sheet, each membrane filter sheet, when in contact with a fluid containing a first concentration of ionic or particulate materials, separating the fluid into a first portion containing a lesser concentration of the materials and a second portion containing a greater concentration of the materials, for discharging the first portion to the tricot sheet and for discharging the second portion other than to the tricot sheet; the tricot sheet for channeling flow of the first portion to and into the fluid permeable core, with the tricot sheet having a peripheral edge; an adhesive for adhering each pair of the membrane filter sheets to the tricot fluid channeling sheet therebetween, and being disposed through the tricot fluid channeling sheet to form a fluid-tight barrier along the peripheral edge of the tricot fluid channeling sheet except for a portion of the edge adjacent the core, the barrier being free of areas wherein quiescent pools of the fluid containing contaminants may form; a cage surrounding at least a portion of the core and leaves; and a housing surrounding the cage and leaves and restraining the core and leaves.

Specific embodiments and preferred aspects of the invention will be described below.

DETAILED DESCRIPTION AND PREFERRED EMBODIMENTS

Figure 1:
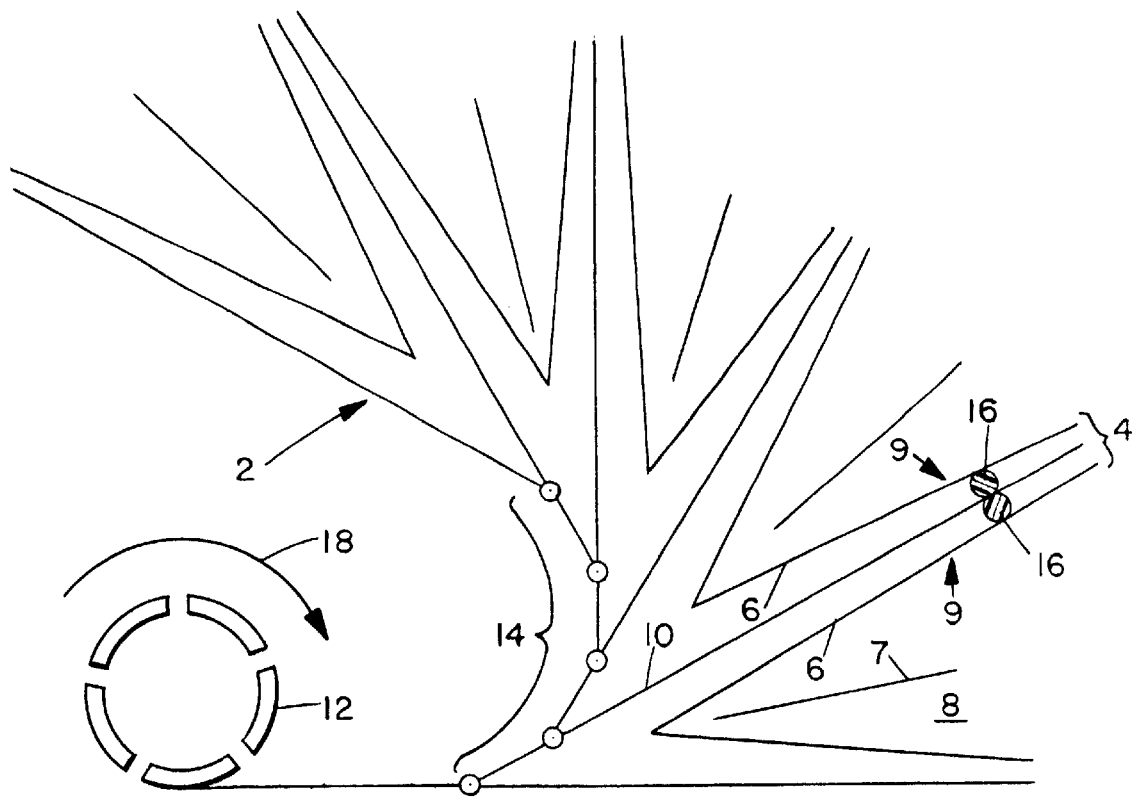
FIG. 1 is a schematic diagram illustrating the typical assembly of a sanitary style filter element.

The invention will be best understood by reference to the Figures of the drawings, which illustrate both the deficient prior art structures and the improved structures of the present invention. FIG. 1 illustrates schematically the basic structure of, a wound membrane sanitary filter element 2, in this case a five-leaf unit. A single leaf 4 will be described, as it will be evident that all leaves are of the same basic construction. The burdened feed liquid (exemplified herein as water) containing the burden materials enters the system on the inlet or fluid contact side 9 of the filtration membrane 6 in the space 8 and its pressure forces a limited portion (typically 10%–15%) through the membrane 6; the portion exiting the membrane is commonly referred to as the filtrate or permeate. The remainder of the fluid, now containing a higher concentration of the burden materials because of the reduction in residual fluid volume, flows across the surface of side 9 and is discharged (as e.g., brine or concentrate) from the element. Typically it may be passed on to successive elements in which further separations occur, yielding more filtrate and further concentrating the burden materials in the brine.

The materials in the fluid are sometimes referred to herein generically as "burden," regardless of whether they are particulated or ionized materials. It will be understood that the sanitary elements of this invention can equally well be used in filtration processes in which the desired end product is clarified fluid filtrate which has been "decontaminated" of the burden materials and in filtration processes in which the desired end product is one or more of the "dewatered" or "concentrated" burden materials. The nature of the principal product desired is not critical to the present invention. For brevity herein the invention will be exemplified in the context of a process in which clarified filtrate or permeate fluid is the desired end product and the burden materials are considered "contaminants" (which may or may not be considered worth recovering separately). This should not be construed as limiting the present invention in any manner, however.

The contaminants in the water are rejected on the inlet side 9 of the membrane. The nature of the membrane, primarily its unique surface chemistry, the material from which is it made, and the nature of the filtration being conducted (e.g., reverse osmosis, ultrafiltration or nanofiltration) will determine what types of contaminants are rejected. Selection of membranes is well known to those skilled in the art, and is not critical for the present invention. Within space 8 is also a feed spacer 7 made of netting or plastic mesh, such as netting made from high or low polyethylene or polypropylene and sold commercially under the trade name "Vexar™" or "Naltex™".

After membrane passage, the purified water permeate is collected within the porous tricot carrier 10, which channels the permeate to the perforated core 12, from which it is drained from the element, either for collection or for passage to another filter element for further filtration. Sequential leaves have their tricot permeate carriers joined, as indicated at 14, so that permeate from each leaf is channeled ultimately to the core 12.

Figure 8:
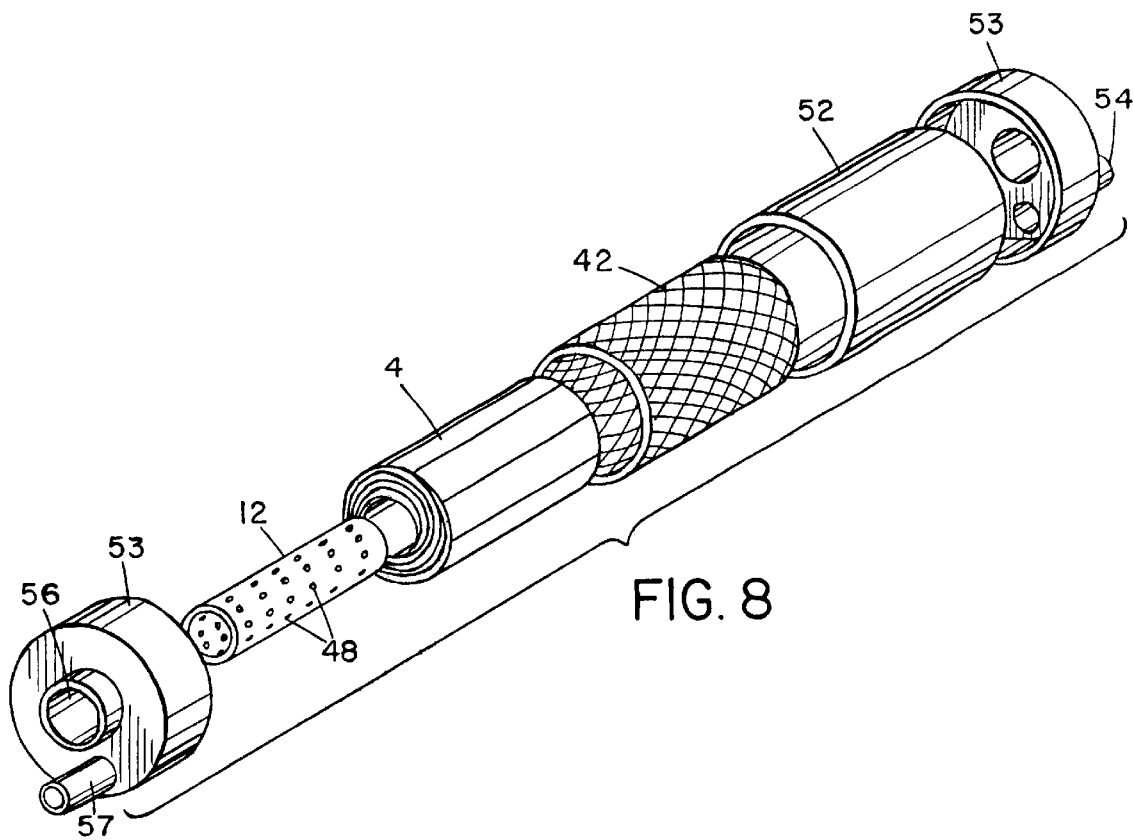
FIG. 8 is a schematic illustration of a typical sanitary filter element.

As indicated in FIG. 8, surrounding the assembly of core 12 wrapped with the wound leaves 4 are normally a sleeve-like cage 42 and, externally of the cage 42, a solid wall cylindrical casing 52 to which are attached members 53 which seal the structure. Burdened fluid enters through an inlet port such as 54 and decontaminated permeate commonly exits through an end 56 of the core 12. The larger volume of residual fluid is discharged thorough outlet port 57. Typical nominal diameters for commercial sanitary element filters are 4" and 8" (10 cm and 20 cm), although in common practice diameters in the range of 2½"–10"(6–25 cm) are found. Thus far the described device is conventional.

Figure 2:
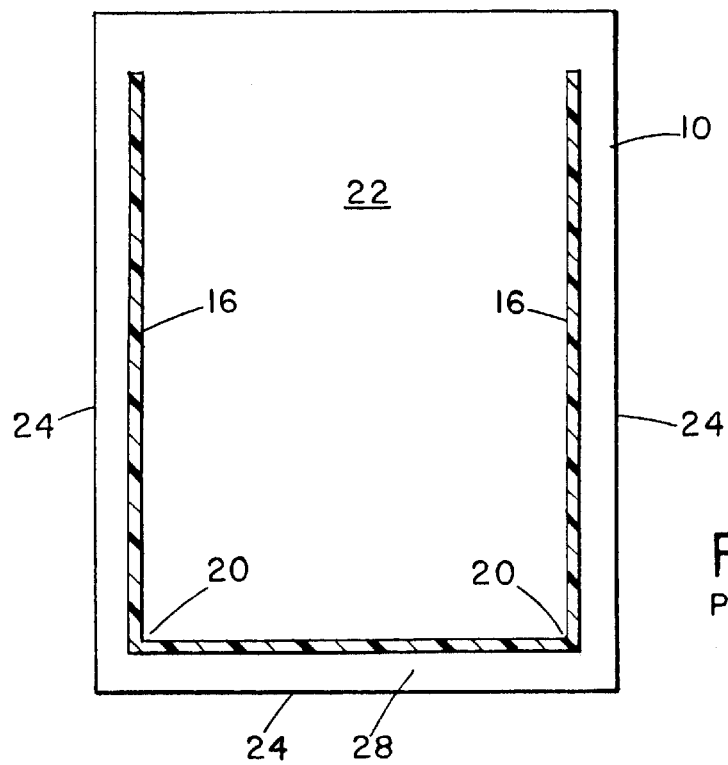
FIG. 2 is a plan view of an adhesive bead configuration of the prior art.

In prior art devices, the membranes and tricot sheets have been adhered together by beads of adhesive 16 which are laid parallel to the sides 24 of the tricot sheet 10 and at a modest distance inward from the edges, as illustrated in FIG. 2. A bead is laid on each side of the tricot sheet, as shown in FIG. 1, and the membranes 6 facing both sides of a tricot sheet 10 are adhered simultaneously when the leaf is wound onto the core, as indicated by arrow 18.

I have found that such a configuration, while believed by the prior art to be satisfactory for sanitary elements, is in fact notably deficient in that it permits pockets of contamination to accumulate in the essentially square corner areas 20 of the adhesive beads. It is believed that is because in the actual operation of filters, there is frictional and surface tension resistance to flow of the washing liquid into the corner areas 20, and such resistance increases as the liquid approaches closer to the point of the corner. Since it is not possible to put the washing liquid under sufficiently high pressure to fully overcome this resistance gradient without causing damage to other components of the filter element, the result is that the corner areas 20 do not get effectively cleaned and contamination accumulates and persists in those areas and migrates to subsequent permeates as they pass into the working area 22 across the tricot sheet's surface.

Figure 3:
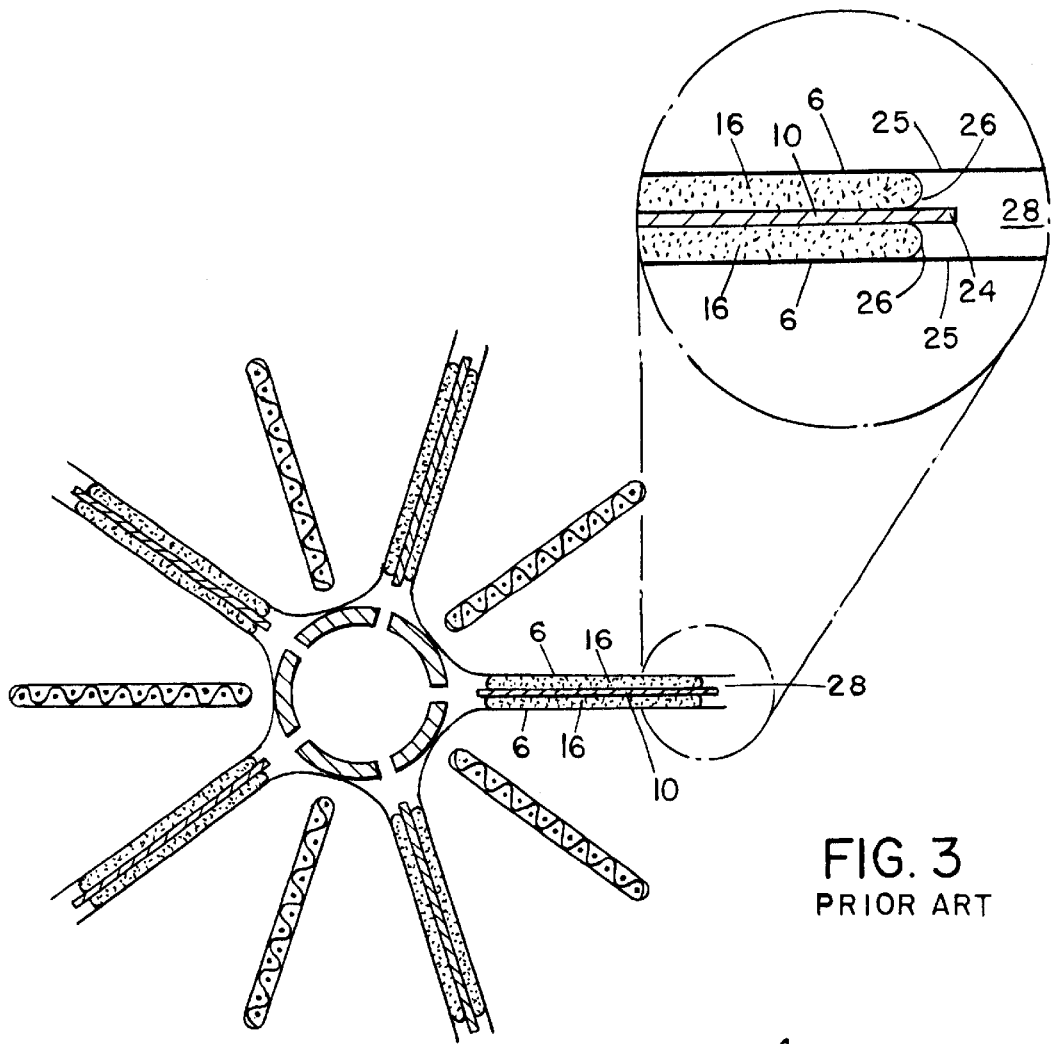
FIG. 3 is a schematic diagram of the components of a prior art sanitary filter.

FIG. 3 illustrates another contamination problem with the prior art devices. Prior art devices are formed, as noted above, with the adhesive beads 16 laid parallel to and somewhat inward from the edges 24 of the tricot sheet 10. Since edges 24 and the corresponding edges 25 of the adjacent membranes 6 therefore normally extend beyond the outer edge 26 of the adhesive bead, a groove-shaped pocket 28 forms around the edge of each leaf 4. The prior art has consider this peripheral pocket 28 to be of no consequence to the performance of the filter element. I have found, however, that during filter operation this pocket 28 accumulates contaminants from the incoming liquid passing through area 8. Since cleaning of the filter operates by flowing cleaning agents through and along the membrane 6, it is normal for the washing fluid to fail to enter the pocket 28, since the moving cleaning fluid tends to press the sheet edges together, further reducing the opening size of the pocket 28. Consequently bacterial growth contamination persists in the pocket 28 and can enter the incoming liquid flow, adding contaminant burden to the liquid and reducing the efficiency of the filter, or even finding its way into the permeate through breaches in the adhesive bead 16.

Figure 4:
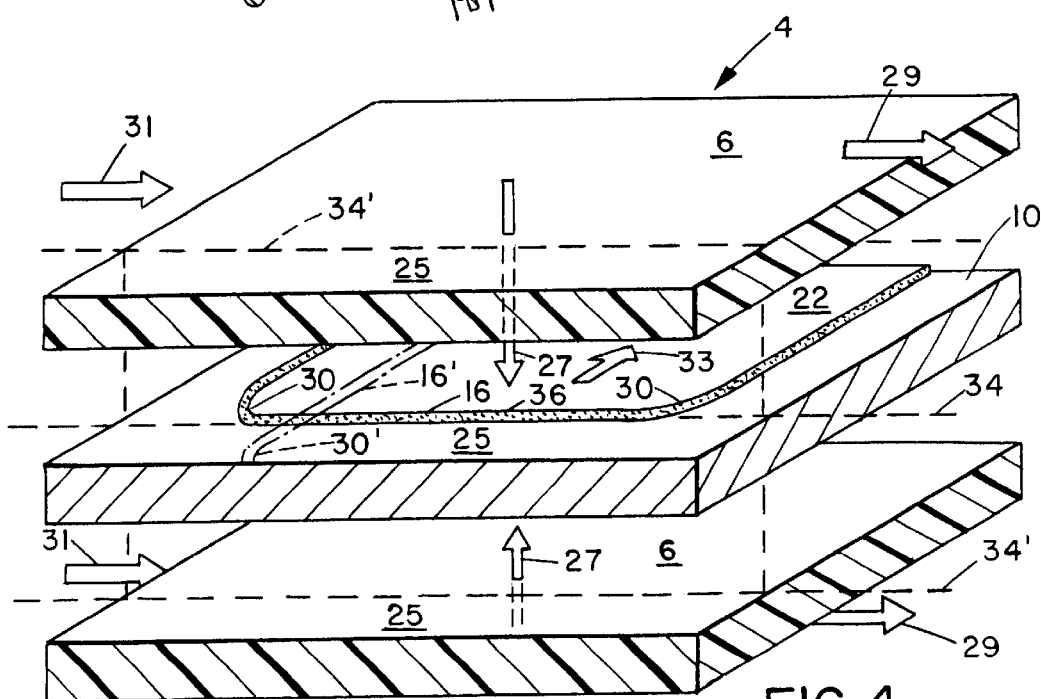
FIG. 4 is an exploded view of a section of a filter leaf of the present invention.
Figure 5:
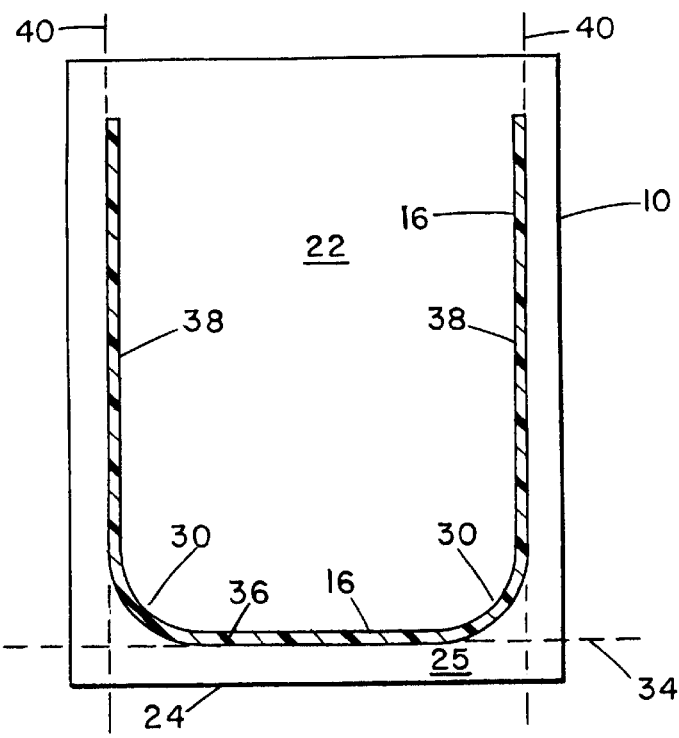
FIG. 5 is a plan view of an adhesive bead configuration of the present invention.
Figure 6:
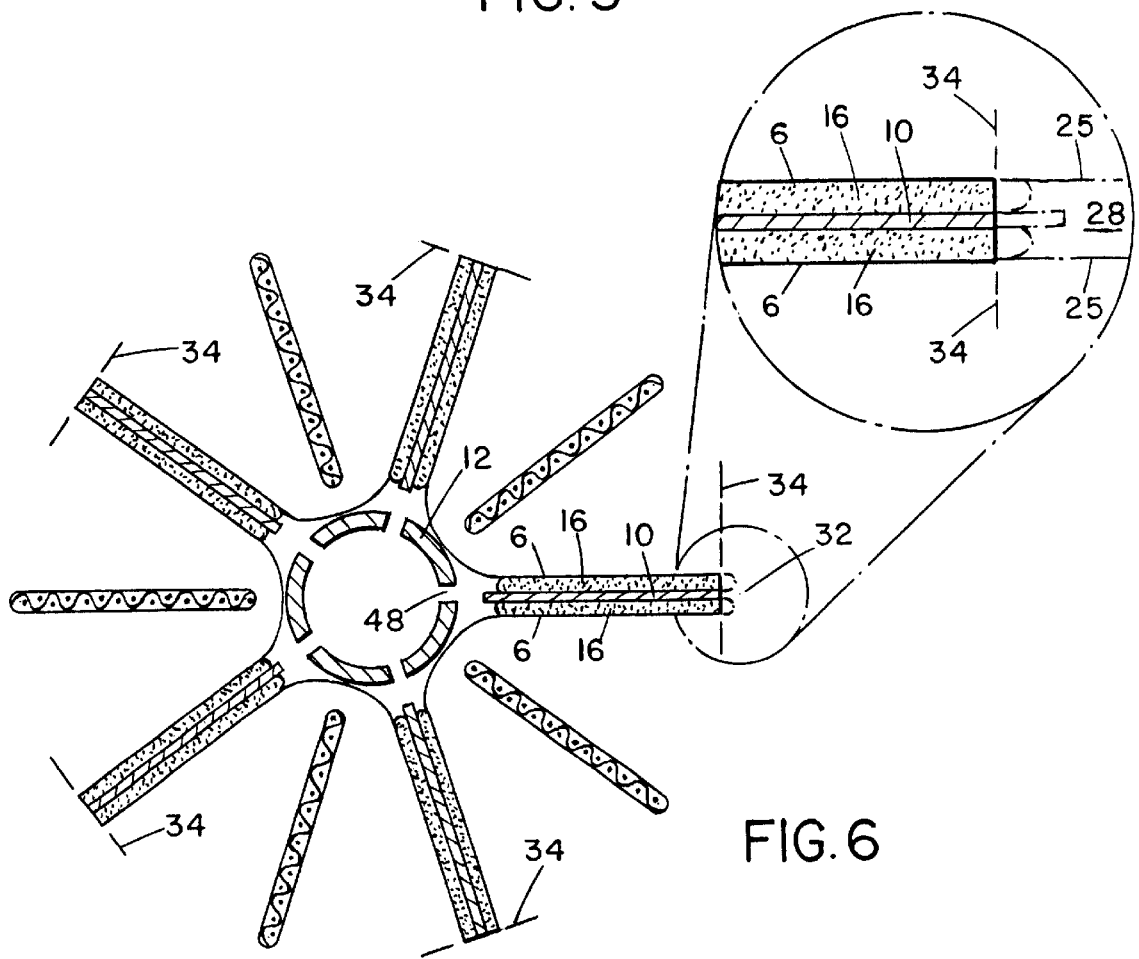
FIG. 6 is a schematic diagram of the components of the wound core portion of a sanitary filter of the present invention.

The present invention overcomes these deficiencies of the prior art devices by the new structural elements shown in FIGS. 4, 5 and 6 (in which fluid flow is indicated by arrows 27). In the filters of the present invention, the adhesive bead 16 during formation of the leaf 4 takes on a substantial curve at each corner as indicated at 30, in marked contrast to the essentially square corners 20 of the prior art filters. (The corresponding bead 16' on the underside of the sheet 10 is shown in phantom in FIG. 4, with a corresponding curved corner at 30'.) The initial bead 16 can be laid down with a curve or with essentially a right angle corner. The latter can be created as the intersection of beads parallel to the sides. If the bead is laid down in a continuous form, the curve at the corner is formed naturally. In either case, the formation of the leaf which creates pressure on the membrane sheets 6 and the tricot carrier sheet causes the adhesive 16 to spread out and create a rounded corner. Since the resultant corner beads are curved as at 30, they offer little or no resistance to entry of the washing fluid, and therefore they cannot harbor any accumulation a of contaminants such as bacteria or bacterial growth supporters. Since the radius of the curved corners will vary according to the size of the filter 2, the membrane and tricot sheets 6 and 10, and the mechanics of forming the leaf, all of which spread out the bead 16, a single radius for the curved corners after fabrication cannot be exactly specified. I have found, however, that a curvature which approximates a radius on the order of about 4" (10 cm) or greater, preferably on the order of about 6"–8" (15–20 cm), is quite satisfactory for most industrial and commercial filter sizes. It is not necessary to have excessively large radii, since those do not significantly improve on the already sufficient cleanability of curved adhesive beads of the radii described above, and they reduce the useable tricot surface area 22. Those skilled in the art will readily be able to determine the appropriate radius for any particular filter of interest.

The related new structural element is that the end 32 of each filter leaf 4 of this invention is, following adhesion of the membranes 6 to the tricot sheet 10 and curing of the adhesive 16, cut off on a line 34 which passes longitudinally substantially along the portion 36 of the adhesive bead 16 which is parallel to the end of the tricot sheet 10, and therefore also through the adhered sheets 6 and along the same line, as indicated at 34'. The result is that the end portion of each of the three sheets 6 and 10 for each leaf is removed at the line of the adhesive bead portion 36, thus eliminating any possibility of the formation of a pocket 28 along the outer end of the leaf 4.

Once the filter elements are rolled, similar cuts are preferably made along the two arms 38 of the U-shaped adhesive bead 16, as indicated by the lines 40 in FIG. 5. Members 53 can then be fitted at the ends of the rolled leaves. These members 53 can serve as end caps, vessel closures and/or anti-telescoping devices, which allow for a small amount of lateral movement of the rolled leaves 4, but do not permit the rolled leaves 4 to spread laterally for any substantial distance.

Figure 7:
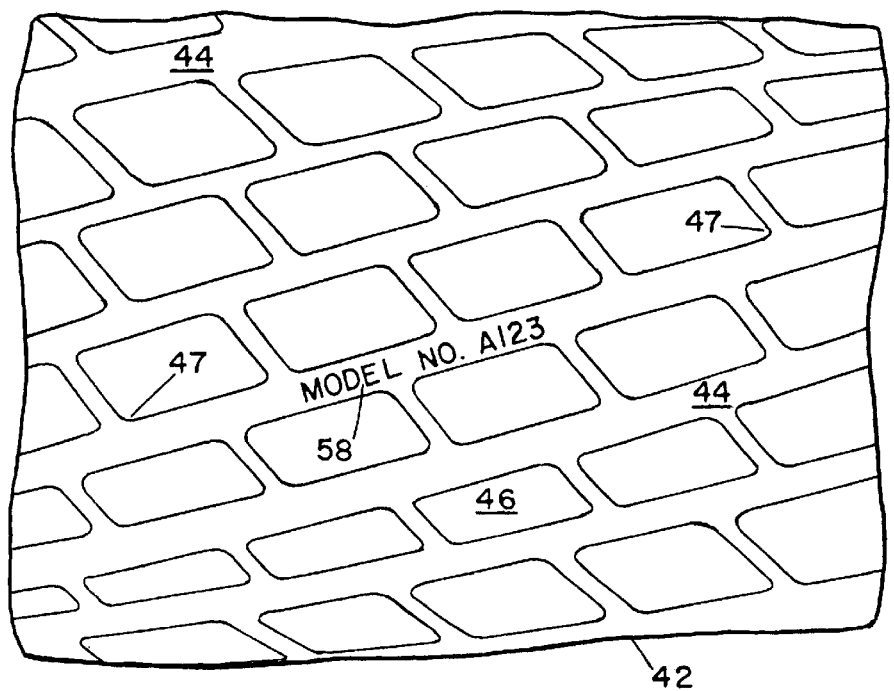
FIG. 7 is an oblique view of a portion of a cage of a filter of the present invention.

Yet another new structural aspect of the present invention is illustrated in FIGS. 6 and 7. Rigid cages surrounding the rolled membrane filter assembly to facilitate by-pass of incoming fluid and insure the optimum use of the entire filter length have been used for some time. Commonly these are in the form of an apertured plastic sleeve 42 which fits snugly over the outer surface of the filter assembly and is of a thickness which just fills the annular space between the outer diameter of the filter assembly and the inside diameter of the wall of the filter element housing 52. The amount of bypass is a function of the resistance to fluid flow of the incoming fluid provided by the cage's circular bands or ribs 44. In the present invention it is important that the cage have an openness of at least 40% (i.e., the apertures 46 comprise at least 40% of the cage structure) so that turbulent flow is assured. However, I have found that increasing the openness of the cage much beyond 65% does not appreciable improve fluid flow, and has the potential for weakening the cage structure since the ribs 44 between the apertures become unduly thin. Thus by limiting the openness of the cage to the range of 40%–65%, ribs of sufficient thickness for rigidity and strength are obtained, which still providing for the desired fluid flow properties of the filter. As an added advantage, the ribs, because they are not unduly thin or narrow, also provide adequate surface area for imprinting, embossing or molding of various permanent indicia thereon, as indicated at 58. Such indicia may conveniently be alpha-numeric information about the cage or filter medium, the name of the manufacturer, the vendor's model number for the element, and the like. If the indicia are to be imprinted rather than being embossed or molded into the ribs, the imprinting ink must be selected to be one which will withstand repeated cleanings of the sanitary element and retain its readability.

The cage sleeve 42 will be in the form of a cylinder, as illustrated in FIG. 7, which may be a right cylinder or a helical cylinder, so that the apertures 46 form bands around the cage 42. The apertures 46 are generally rectangular or rhomboidal, but the corners of the apertures 46 are all rounded as shown at 47 to prevent the collection of contaminant materials that could occur in the corners if they were sharply angled rather than rounded. The cage structure creates a turbulent flow regime in the annular space. Those skilled in the art will be readily able to select appropriate plastics or metals depending on such known factors as intended fluid flow rate, filter element size, fluid composition to be filtered, and so forth.

The filter element components of this invention may be made of materials common to filter technology. It is particularly preferred that the core tube 12 be made of polysulfone resin and that it be fabricated so as to be free of burrs in the permeate flow holes 48. The membrane will be composed of the appropriate known material for the degree of porosity needed based on the contaminants to be removed, and for the chemical nature of the fluid to be filtered. Similarly the tricot sheet will be selected based on the desired fluid flow of permeate and its chemical nature. Polyurethane is preferably used for the adhesive 16. Where food, beverage, pharmaceutical and similar end uses are intended, all filter components will be made of materials which comply with protocols of the Food and Drug Administration. The FDA definitions of acceptable reverse osmosis (RO) membranes for liquid food separation are found in §177.2550 of Title 21 of the Code of Federal Regulations, and state that acceptable RO membranes may be any of the following:

(1) A cross-linked high molecular weight polyamide reaction product of 1,3,5-benzenetricarbonyl trichloride with 1,3-benzenediamine (CAS Reg. No. 83044-99-9) or piperazine (CAS Reg. No. 110-85-0). The membrane is on the food-contact surface, and its maximum weight is 62 milligrams per square decimeter (4 milligrams per square inch) as a thin film composite on a suitable support.

(2) A cross-linked polyetheramine (CAS Reg. No. 101747-84-6), identified as the copolymer of epichlorohydrin, 1,2-ethanediamine and 1,2-dichloroethane, whose surface is the reaction product of this copolymer with 2,4-toluenediisocyanate (CAS Reg. No. of the final polymer is 99811-80-0) for use as the food-contact surface of reverse osmosis membranes used in processing liquid food. The composite membrane is on the food-contact surface and its maximum weight is 4.7 milligrams per square decimeter (0.3 milligrams per square inch) as a thin film composite on a suitable support. The maximum weight of the 2,4-toluenediisocyanate component of the thin film composite is 0.47 milligrams per square decimeter (0.03 milligrams per square inch).

(3) A polyaramide identified as 2,4-diaminobenzenesulfonic acid, calcium salt (2:1) polymer with 1,3-benzenediamine, 1,3-benzenedicarbonyl dichloride, and 1,4-benzenedicarbonyl dichloride (CAS Reg. No. 39443-76-0). The membrane is the food contact surface and may be applied as a film on a suitable support. Its maximum weight is 512 milligrams per square decimeter (33 milligrams per square inch).

(4) A cross-linked high molecular weight polyamide reaction product of poly(N-vinyl-N-methylamine) (CAS Reg. No. 31245-56-4), N,N'-bis(3-aminopropyl)ethylenediamine (CAS Reg. No. 10563-26-5), 1,3-benzenedicarbonyl dichloride (CAS Reg. No. 99-63-8) and 1,3,5-benzenetricarbonyl trichloride (CAS Reg. No. 4422-95-1). The membrane is the food-contact surface. Its maximum weight is 20 milligrams per square decimeter (1.3 milligrams per square inch) as a thin film composite on a suitable support.

(5) A polyamide reaction product of 1,3,5-benzenetricarbonyl trichloride polymer (CAS Reg. No. 4422-95-1) with piperazine (CAS Reg. No. 110-85-0) and 1,2-diaminoethane (CAS Reg. No. 107-15-3). The membrane is the food-contact layer and may be applied as a film on a suitable support. Its maximum weight is 15 milligrams per square decimeter (1 milligram per square inch).

Since the present invention is not membrane-specific, it is contemplated that other membranes will also be suitable, especially for applications where food contact is not involved. Further, it is also contemplated that the FDA will approve other membranes in the future, including ones not yet developed, and that those membranes will also be suitable for use in the present invention.

Fabrication is in the manner described generally above. In a particularly preferred aspect of fabrication, however, an adhesive-impervious sheet 50 (see FIG. 6), such as a plastic sheet, is temporarily placed between adjacent membrane 6 and netting 7 sheets during and before curing of the adhesive 16 to bond the membrane sheets 6 to adjacent tricot sheets 10. The presence of the temporary plastic sheets 50 prevents any migration of the adhesive 16 to the membrane and adjacent feed spacers 7, thus avoiding inadvertent contact adhesions between the membranes 6 and the feed spacers 7. As part of the filter fabrication process, after the leaf assembly has been rolled and the adhesive cured to bond the membranes 6 and the tricot sheets 10, the assembly is partially unrolled. At this time the temporary plastic sheets 50 are removed, taking with them any excess cured adhesive 16 which may have migrated through the membranes 6. Since all the adhesive is at that time fully cured, when the assembly is rerolled for placement of the cage sleeve 42 and final fabrication of the filter element, there is no longer any potential for random contact adhesions between the membranes 6 and the feed spacers 7 to occur. This unique step in the fabrication process thus eliminates a serious problem in the prior art products be eliminating potential bacterial breeding sites.

The sanitary filter elements of the present invention may be advantageously used in many different applications where high purity filtrate is required. Such applications include, but are not limited to, food and beverage processing, milk purification in the dairy industry, manufacturing of pharmaceuticals and specialty chemicals, water purification for laboratory and research applications, and the like.

It will be evident that there are numerous embodiments of the present invention which are not expressly described above, but which are clearly within the scope and spirit of the invention. The above description is therefore to be considered exemplary only, and the actual scope of the invention is to be defined solely by the appended claims.

I claim:

1. A sanitary filter comprising:
   a central fluid permeable core having extending therefrom a plurality of eaves, each leaf comprising a pair of membrane filter sheets having adhered therebetween a tricot sheet,
   each said membrane filter sheet, when in contact with a fluid containing a first concentration of ionic or particulate materials, separating said fluid into a first portion containing a lesser concentration of said materials and a second portion containing a greater concentration of said materials, for discharging said first portion to said tricot sheet and for discharging said second portion other than to said tricot sheet;
   said tricot sheet for channeling flow of said first portion to and into said fluid permeable core, with said tricot sheet having a peripheral edge;
   an adhesive for adhering each pair of said membrane filter sheets to said tricot fluid channeling sheet therebetween, and being disposed through said tricot fluid channeling sheet to form a fluid-tight barrier along said peripheral edge of said tricot fluid channeling sheet except for a portion of said edge adjacent said core, said barrier being free of areas wherein quiescent pools of said fluid containing contaminants may form;
   a cage surrounding at least a portion of said core and leaves; and
   a casing surrounding said cage and leaves and restraining said core and leaves.

2. A sanitary filter element as in claim 1 wherein said cage further comprises an apertured hollow cylinder wherein apertures comprise at least 40% of a wall of said cylinder.

3. A sanitary filter element as in claim 2 wherein said apertures comprise 40% –65% of said wall of said cylinder.

4. A sanitary filter element as in claim 2 wherein portions of said cage between said apertures are of widths and thicknesses sufficient to accept readily visible indicia.

5. A sanitary filter element as in claim 4 wherein said indicia comprises alphanumeric characters and is applied to said portions in a manner which makes the indicia a permanent part of said portion.

6. A sanitary filter element as in claim 5 wherein said manner comprises embossing, molding or by application of cleaning resistance ink.

7. A sanitary filter element as in claim 1 wherein each curvature of said barrier has a radius of not less than about 4".

8. A sanitary filter element as in claim 7 wherein each curvature of said barrier has a radius of not less than about 6"–8".

9. A sanitary filter element as in claim 1 further comprising an adhesive-impervious sheet material disposed between a membrane filter sheet and an adjacent netting sheet before and during curing of said adhesive and bonding of said membrane filter sheet and an adjacent tricot fluid channeling sheet.

10. A sanitary filter element as in claim 1 wherein said membrane filter sheet is formed of a material acceptable for filtration of liquid food products.

11. In a sanitary filter element comprising a central fluid permeable core having extending therefrom a plurality of leaves, each leaf comprising a pair of membrane filter sheets having adhered therebetween a tricot sheet, with each said membrane filter sheet, when in contact with a fluid containing a first concentration of ionic or particulate materials, separating said fluid into a first portion containing a lesser concentration of said materials and a second portion containing a greater concentration of said materials, for discharging said first portion to said tricot sheet and for discharging said second portion other than to said tricot sheet; and said tricot sheet for channeling flow of said first portion to and into said fluid permeable core, with said tricot sheet having a peripheral edge;

the improvement which comprises:

an adhesive for adhering each pair of said membrane filter sheets to said tricot fluid channeling sheet therebetween, and being disposed through said tricot fluid channeling sheet to form a fluid-tight barrier along said peripheral edge of said tricot fluid channeling sheet except for a portion of said edge adjacent said core, said barrier being free of areas wherein quiescent pools of said fluid containing contaminants may form;

a cage surrounding at least a portion of said core and leaves, comprising an apertured hollow cylinder wherein apertures comprise at least 40%–65% of a wall of said cylinder and portions of said cage between said apertures are of widths and thicknesses sufficient to accept readily visible alphanumeric characters; and a casing surrounding said cage and leaves and restraining said core and leaves.

12. In a sanitary filter element as in claim 11, the improvement wherein said indicia comprises alphanumeric characters and is applied to said portions in a manner which makes the indicia a permanent part of said portion.

13. In a sanitary filter element as in claim 12, the improvement wherein said manner comprises embossing, molding or by application of cleaning resistance ink.

14. In a sanitary filter element as in claim 11, the improvement wherein each curvature of said barrier has a radius of not less than about 4".

15. In a sanitary filter element as in claim 14, the improvement wherein each curvature of said barrier has a radius of not less than about 6"–8".

16. In a sanitary filter element as in claim 11, the improvement further comprising an adhesive-impervious sheet material disposed between a membrane filter sheet and an adjacent netting sheet before and during curing of said adhesive and bonding of said membrane filter sheet and an adjacent tricot fluid channeling sheet.

17. In a sanitary filter element as in claim 11, the improvement further comprising said membrane filter sheet being formed of a material acceptable for filtration of liquid food products.

* * * * *